United States Patent [15] 3,687,160
Erickson et al. [45] Aug. 29, 1972

[54] THERMAL COMPENSATOR VALVE FOR DIFFERENTIAL PRESSURE DEVICES

[72] Inventors: Rodney R. Erickson, Joilet, Ill.; Ralph W. Matthews, Franklin, Wis.; Richard V. Sprangel, Peoria, Ill.

[73] Assignee: Caterpillar Tractor Co., Peoria, Ill.

[22] Filed: Oct. 21, 1970

[21] Appl. No.: 82,837

Related U.S. Application Data

[63] Continuation of Ser. No. 762,711, Sept. 26, 1968, abandoned.

[52] U.S. Cl. ............... 137/599.1, 236/93, 137/468
[51] Int. Cl. ............................................. F23b 13/00
[58] Field of Search ........... 236/93, 99, 101, 103, 468

[56] References Cited

UNITED STATES PATENTS

| | | | |
|---|---|---|---|
| 2,986,380 | 5/1961 | Read | 261/39 |
| 3,237,862 | 3/1966 | Salerno | 236/93 |
| 3,309,234 | 3/1967 | Rundles | 136/161 |
| 3,398,692 | 8/1968 | Suggs | 417/282 |
| 3,472,214 | 10/1969 | Moon | 236/93 |

*Primary Examiner*—Harold W. Weakley
*Attorney*—Fryer, Tjensvold, Felix, Phillips & Lempio

[57] ABSTRACT

A hydraulic control system employing pressure differentials for control functions will maintain uniform pressure differentials over a broad temperature range by incorporation of the thermal compensator valve connected in parallel with the pressure differential generating device so the fluid flow through the device is controlled as a function of temperature to maintain a constant output from a device for a given set of physical conditions. The valve itself includes an inlet and an outlet with a flow-control spool disposed in a passage therebetween to meter the fluid and a thermal responsive element connected to position the spool in response to fluid temperature whereby the output of the device will remain essentially constant for a given physical set of conditions regardless of the temperature of the fluid.

1 Claim, 4 Drawing Figures

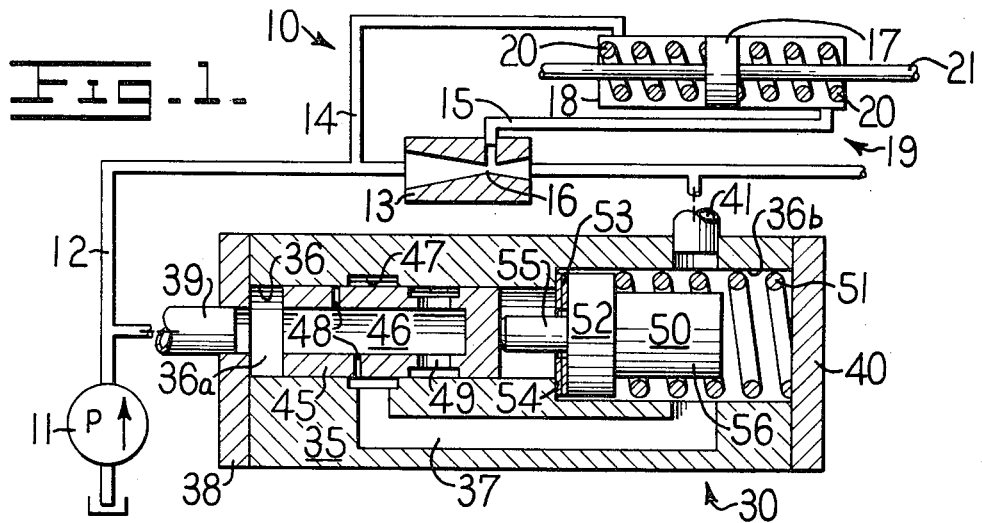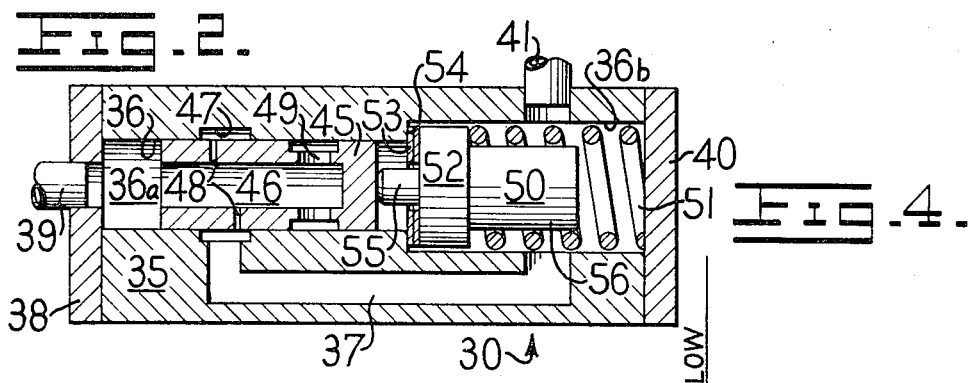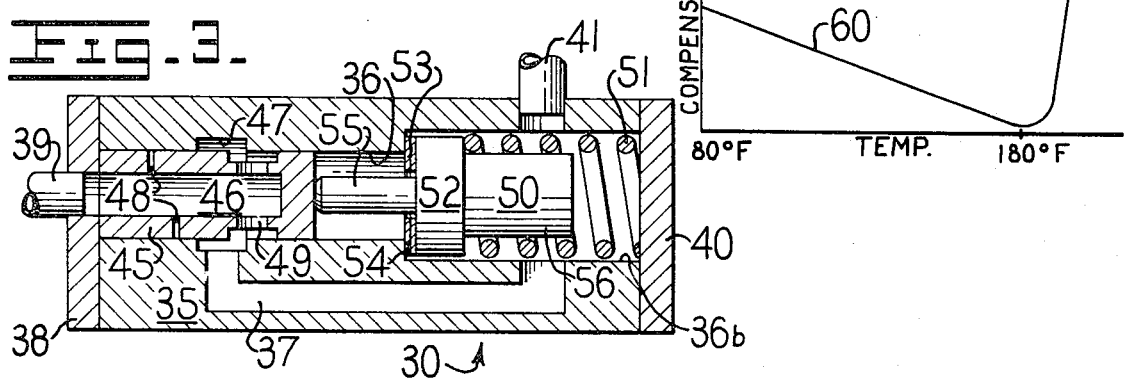

THERMAL COMPENSATOR VALVE FOR DIFFERENTIAL PRESSURE DEVICES

This is a continuation of application, Ser. No. 762,711, filed Sept. 26, 1968, and now abandoned.

BACKGROUND OF THE INVENTION

A hydraulic control system may employ a positive displacement hydraulic pump to provide an output proportional to its driven speed. Usually, the pump is driven by a power plant or a rotary element of a transmission. The hydraulic output of the pump is then employed in a differential pressure generating device, such as a venturi unit, to develop a differential pressure signal which is proportional to the speed of the pump. Such a signal can then be used to control the machine driving the pump, such as a power plant, or other equipment driven in common with the pump, such as an automatic transmission. U.S. Pat. application, Ser. No. 645,912 by Cryder, et al., filed June 14, 1967 now U.S. Pat. 3,477,225, discloses a typical hydraulic control system for a transmission employing differential pressure signals for control.

A differential pressure hydraulic control system, like those referred to above, will work extremely well at a constant temperature, i.e., stable fluid temperature in the control system. However, much variation in temperature on either side of a selected operating temperature will result in a differential pressure signal which is not truly indicative of the physical conditions being monitored by the control system. Further, wide deviations in signals often occur at lower temperatures where the viscosity of the fluid increases sharply and may be so extreme that the control system is unsatisfactory for cold weather operation. Further, without compensation, the signal information will not be stable until the fluid temperature in the system becomes constant which can cause signals to drift during the machine warm-up period.

SUMMARY OF THE INVENTION

A method and valve for stabilizing the operation characteristics of a hydraulic differential pressure generating device over a broad temperature range, comprising the combination of a valve body having an inlet and an outlet connected in parallel with a differential pressure generating device to be stabilized, a metering spool controlling a flow passage in said valve body between said inlet and said outlet, said element including port means insuring a minimum flow through the passage at all times and a second port means operable to bypass a larger portion of the fluid through the valve when an over-temperature condition occurs, and a thermal-responsive means mounted in said body which has a temperature sensitive portion located in the flow passage of the valve, said thermal-responsive means having a plunger abutting on the spool means to control its position relative to temperature and opens said second port means when an over-temperature condition occurs.

BRIEF DESCRIPTION OF THE DRAWINGS

FIG. 1 illustrates a hydraulic control system employing a venturi unit as a differential pressure generating device supplied by a positive displacement pump with the novel compensating valve connected in parallel with the venturi unit;

FIG. 2 is a longitudinal section of the novel compensator valve illustrating the component positions when the control fluid is below its normal operating temperature;

FIG. 3 is a section similar to FIG. 2 illustrating the component positions when the allowable operating temperatures have been exceeded and substantial fluid bypass is occurring; and FIG. 4 is a graph showing the bypass fluid flow through the compensator valve.

DESCRIPTION OF AN EMBODIMENT

A basic part of a typical hydraulic control system 10 is illustrated in FIG. 1, and includes a positive displacement pump 11 whose output is connected through line 12 to a venturi unit 13. A tap line 14 is taken directly from line 12, ahead of the venturi unit, while another tap line 15 is taken from the throat 16 of the venturi unit. These two lines are then connected on opposite sides of piston 17 mounted in cylinder 18 which forms a transducer unit 19. Centering springs 20 on opposite sides of the piston maintain it in a neutral position until a differential pressure is developed, at which time the piston shifts until the spring forces offset the differential pressure between the two tap lines. Assuming the springs are linear, the shift of rod 21 connected to the piston will always be directly proportional to the pressure differential. In this manner, a signal is generated proportional to the speed of the positive displacement pump which is driven by an engine or like device, being controlled. This signal can be used in a conventional servo control loop (not shown).

The instant invention employs the compensator valve 30 connected between the output line 12 of the pump and the outlet of the venturi unit to form a parallel flow path for the fluid from the pump so that a portion thereof can be bypassed. Normally, such a parallel flow path, unless constant, would make the system inoperable. However, the instant invention varies the bypass flow so that the signal output of the transducer 19 remains substantially constant over a wide range of temperatures for a given pump rpm. This is accomplished by metering the flow through the compensator valve to adjust for changes in pump output for changing operating temperatures.

The compensator valve 30 includes an elongated valve body 35 having a stepped central bore 36 extending therethrough with a separate parallel passage 37 interconnecting the smaller diameter portion 36a of the bore with the larger diameter portion 36b near the opposite ends of the valve body. An inlet plate 38 having an inlet 39 closes the smaller portion of the bore at one end of the body while a similar end plate 40 is used to close the other end, having the larger bore. An outlet 41 communicates with the larger portion of the bore near the end plate.

Flow from the inlet to the outlet of the valve is controlled by a cylindrical spool 45 having a blind bore 46 and which is reciprocably mounted in the smaller portion of the stepped bore 36. When the fluid in the system is cold, the spool will be in the position shown in FIG. 2 which allows a substantial portion of fluid to bypass the venturi unit, through groove 47, passage 37 and outlet 41. As can be seen with the spool in the position illustrated in FIG. 2, a flow of fluid can enter the groove 47 from the inlet through the small radial orifices 48 in the wall of the spool.

At normal operating temperatures, the spool 45 will be in the "run" position (illustrated in FIG. 1) and only a small volume of the fluid will pass through orifices 48 into groove 47 and thence through passage 37 to the outlet 41 of the valve. This arrangement provides a small flow of fluid through the valve at all times so that any temperature changes of the fluid can be sensed by downstream sensitive temperature elements to properly position the spool in response thereto. Should the fluid passing through the valves substantially exceed the preselected maximum operating temperature, the spool will automatically be moved to the "overtemp" position, illustrated in FIG. 3, where ports 49 in the spool will communicate with groove 47 and bypass enough of the fluid around the venturi, whereby a positive indication will be given to the operator that something is wrong with the machine and it should be shut down to protect the systems.

The position of the spool 45 is controlled by a thermal-element 50 which is positioned in the larger portion 36b of the step bore 36 and retained by spring 51 which urges the enlarged head portion 52 of this element against spacers 53 bearing on shoulder 54 at the junction of the two bores. End wall 40 retains the opposite end of the spring. Through this arrangement, the proper setting of the valve can be easily accomplished by adding or reducing spacers for the normal operating condition.

The thermal-element, which is available commercially, includes a plunger 55 which abuts on the closed end of the spool and which is reciprocated by a thermal responsive bellows structure (not shown) in its body section 56. In all positions of the spool, some of the fluid will pass into passage 37 via radial ports 48 and across the body section of the thermal-responsive element to the outlet 41. This small flow insures that the thermal-responsive means will be able to sense the temperature of the fluid at all times and adjust the position of the spool accordingly. Normally, the plunger is reciprocated by a bellows-type element which is responsive to temperature changes but other types of commercially available temperature-operated devices can be used.

In general, it should be remembered that the plunger continues to extend with increasing temperature in a proportioned manner so this valve operates to keep the venturi unit's operating characteristics constant over a broad range of temperatures. As illustrated in FIG. 4, the compensator flow, line 60, demonstrates the bypass flow through the valve from start-up of about 80° F. to the normal conditions of 180° F. It also illustrates a sharp increase in flow if the maximum operating temperature is exceeded, i.e., above 185° F. As the temperature of the fluid increases to these operating temperatures, there will be no variations in signals since compensation will occur through the metering operation of the valve. Through the use of this valve, the response of transducer 19 has a uniformed signal proportional to the actual operating speed of the pump at all times. Therefore, the signals will not be erratic due to variations in temperature or during warm-up periods. Thus, better performance is obtained from the control system at an economical cost.

We claim:

1. A thermal compensator flow valve for stabilizing the operating characteristics of a hydraulic differential pressure generating device over a broad temperature range comprising:

a valve body having an inlet, an outlet and a flow passage between said inlet and outlet which is connected in parallel with a hydraulic differential generating device needing stabilization over a wide temperature range;

a valve spool disposed in said flow passage having an orifice means insuring minimum fluid flow from said inlet to said outlet through said flow passage and arranged serially therein to decrease flow therethrough as said valve spool is driven unidirectionally in said flow passage, said valve spool also including port means to subsequently abruptly increase fluid flow through said flow passage as said valve spool is further driven unidirectionally in said flow passage, said valve spool arranged in said flow passage so inlet pressure will urge it in a direction to increase fluid flow through said flow passage through said orifice means; and a thermal responsive means having a temperature responsive element located in said flow passage downstream of valve spool adjacent to said outlet placing it in continuous communication with fluid flow through said flow valve, said temperature responsive element having a plunger engaging said valve spool operable to drive said valve spool unidirectionally against said inlet pressure acting said valve spool to first decrease fluid flow through said flow passage and subsequently abruptly increase fluid flow through said flow passage as the temperature of the fluid flowing through said flow passage continues to increase whereby the fluid flow through said flow passage will be inversely proportional to temperature up to a predetermined temperature.

* * * * *